Patented May 15, 1951

2,552,900

UNITED STATES PATENT OFFICE 2,552,900

METHOD OF COATING WOOD

Paul E. McCoy, San Francisco, Calif., assignor, by mesne assignments, to Stancal Asphalt & Bitumuls Company, San Francisco, Calif., a corporation of Delaware No Drawing. Application November 30, 1946, Serial No. 713,387

7 Claims. (Cl. 117—72)

This invention relates to emulsion paints and to a method of improving the bond between emulsion paint and surfaces coated therewith, particularly wooden surfaces.

Emulsion paints contain an oil-in-water type emulsion of a thermoplastic, non-drying organic material such as asphalt, coal tar, coal tar pitch, paraffin wax, etc.; and they usually also contain a pigment and a filler. Typical of such paints are asphalt emulsion paints prepared as follows:

Asphalt is emulsified in water by means well known in the art and the emulsion is stabilized against breakdown caused by mineral pigment and mineral dust, by incorporating in the emulsion a stabilizing agent. Examples of suitable stabilizing agents are waste sulfite liquor, certain proteins such as water miscible blood and casein, and Vinsol resin. A mineral dust (such as limestone dust, slate flour or ground mica) and/or a fibrous filler (such as asbestos or shives from flax), and a pigment (such as chromium oxide, Spanish red oxide, Hansa yellow or carbon black) are incorporated in and mixed with the emulsion. It is also customary to incorporate a small amount of bentonite clay or other colloidal clay in the paint to improve the brushing consistency of the paint and to improve its adhesion to wooden surfaces and the like. Typical emulsion paint formulae are as follows:

(a)

Fibrated emulsion paint:

| | Pts. by wt. |
|---|---|
| Mixing type asphalt emulsion of McKesson, U. S. Pat. 2,074,731 (stabilized by blood) | 35–45 |
| Asbestos fiber | 8–12 |
| Diatomaceous earth | 1–3 |
| Pigment | 1–20 |
| Water  Q. S. to make | 100 |

(b)

Non-fibrated emulsion paint:

| | Pts. by wt. |
|---|---|
| Mixing type asphalt emulsion of Buckley, U. S. Pat. 2,256,886 | 60–80 |
| Diatomaceous earth | 2–6 |
| Pigment | 3–20 |
| Water  Q. S. to make | 100 |

In compounding such paints, it is common practice to wet the pigment and fillers with the full amount of water, agitate to a smooth paste, add the emulsion, by degrees if necessary, to bring to a pasty consistency, and then add the rest of the emulsion. The ingredients are mixed together thoroughly.

As is well known in the art, other ingredients and other proportions than those specifically exemplified above may be used. Thus, other fibrous and non-fibrous fillers may be used, a great variety of pigments may be used, and instead of asphalt, other bituminous materials such as coal tar, coal tar pitch, paraffin wax may be used.

Such emulsion paints are widely used and have an important advantage over paints in which the base is a drying substance such as linseed oil, in that a non-drying base such as asphalt is much cheaper. Also the thinner or solvent for emulsion paint, being water, is much cheaper than the organic solvent used in linseed oil paints and the like.

Emulsion paints suffer, however, from the disadvantage that they do not bond or adhere as well to certain surfaces, principally wood, as do linseed oil and other similar paints.

It is an object of this invention to provide a means whereby the bonding or adhesion of emulsion paint to the coated surface can be improved.

It is a particular object of this invention to provide a means whereby emulsion paints can be caused to bond or adhere securely to wooden surfaces.

It is a further particular object of the present invention to provide a means whereby asphalt emulsion paint can be caused to bond or adhere securely to wooden surfaces.

These and other objects of the invention will be apparent from the ensuing description and the appended claims.

In accordance with the invention, the surface which is to be coated by an emulsion paint is first primed or coated with a solution, preferably an aqueous solution, of a thermosetting resin which is capable of polymerization on contact with wood to produce an impermeable tenacious film thereon.

We have discovered that, where an emulsion paint is applied to a surface, especially to a wooden surface, so treated, the dried, cured film of paint will adhere tenaciously to the surface.

Examples of suitable thermosetting resins are dimethylol urea resins; phenolic resins, such as phenol-formaldehyde resins; melamine resins, etc. The resins are used in the form of water-soluble polymers or monomers. Dimethylol urea resins are, however, preferred by reason of economy and effectiveness.

In the practice of the invention, the surface to be treated, if old or painted, should first be cleaned so as to expose a clean, smooth surface. The resin is applied to the clean surface, preferably in the form of an aqueous solution, although other solvents, such as alcohol, may be used. The concentration of resin in the solution may vary within wide limits, but in general as high a concentration as is permitted by solubility of the resin in the solvent will be used. Thus, in the case of aqueous solutions of dimethylol urea, it is preferred to employ a 15-20% solution. The solution may be brushed, sprayed or mopped on the wood. The amount of resin so applied to the surface may also vary within wide limits, depending upon factors such as the porosity of the wood (more porous wood requires a greater amount of treatment), concentration of primer and economic considerations. One gallon of 15-20% solution will ordinarily be used per 300-600 sq. ft. of surface coated.

After the surface has been treated, it should be allowed to dry and cure for some time, usually for 24 hours. It is unnecessary to apply heat to the surface. When the priming coat has dried and set, the emulsion paint is then applied in the ordinary way.

The following specific examples will serve further to illustrate the practice and advantages of the invention.

Two wooden panels were coated with two coats each of a 15% aqueous solution of dimethylol urea resin and were then allowed to dry for 24 hours at 70° F. The dimethylol urea resin used was the primary condensation product of two mols of formaldehyde and one mol of urea, a white, chalky solid, having the following properties:

Formula _____ $CO(NHCH_2OH)_2$
Molecular weight _____ 120.1
Melting point of 87-90%
  DMU _____ 85 to 90° C.
Melting point of pure
  DMU _____ 126° C.
Density at 20° C. _____ 1.32-1.35
Density of 20% aqueous
  solution at 60° F. _____ 1.055
pH of 10% aqueous solution _____ 8.0 to 8.5
Formaldehyde-urea molar
  ratio _____ 1.95-2.05 to 1.0
Color _____ White
Odor _____ That of formaldehyde The panels, after drying, were treated as follows: One of them was coated by spatula with a commercial asphalt emulsion paint containing ferric oxide as pigment. The other was similarly coated with a fire retardant type paint comprising emulsified chlorinated diphenyl and fibrous and non-fibrous fillers. The panels were allowed to dry for 48 hours and were then subjected to 300 hours weathering in a National Carbon Arc Weathering unit. This period of weathering is equivalent to one year of outdoor exposure. The panels, after exposure to this weathering treatment, were in perfect condition whereas panels treated with the same paints but not having been first primed with resin solution would have been in very poor condition. The panel which had been coated with chlorinated diphenyl paint was subjected to a fire test in which the painted surface was subjected to a hot flame. Fireproofness was found to be excellent.

I claim:

1. The method of providing a wooden surface with a tenacious bituminous coating by means of a bituminous emulsion paint, which comprises the steps of first applying to such wooden surface a water solution of a resinifying thermosetting agent in the uncured stage, curing the said agent to effect polymerization and conversion thereof to the thermoset stage, then applying to the resulting woolen surface a bituminous emulsion paint, whereby upon drying of said emulsion paint an impervious, tenacious film of bitumen having superior weathering properties is formed on the wooden surface.

2. The method substantially as described in claim 1, wherein the resinifying thermosetting agent is dimethylol urea.

3. The method substantially as described in claim 1, wherein the bituminous emulsion paint is an asphaltic emulsion paint.

4. The method substantially as described in claim 1, wherein the resinifying thermosetting agent is dimethylol urea, and the bituminous emulsion paint is an asphaltic emulsion paint.

5. The method of providing a wooden surface with a tenacious bituminous coating by means of a bituminous emulsion paint, which comprises the steps of first applying to such wooden surface a water solution of a thermosetting resin in the uncured stage, heating the said resin to convert said resin to the thermoset stage, then applying to the resulting wooden surface a bituminous emulsion paint, whereby upon drying of said emulsion paint an impervious, tenacious film of bitumen having superior weathering properties is formed on the wooden surface.

6. The method substantially as described in claim 5, wherein the bituminous emulsion paint is an asphaltic emulsion paint.

7. The method substantially as described in claim 6, wherein the thermosetting resin is a formaldehyde urea resin.

PAUL E. McCOY.

REFERENCES CITED

The following references are of record in the file of this patent:

UNITED STATES PATENTS

| Number | Name | Date |
| --- | --- | --- |
| 1,447,782 | Holland | Mar. 6, 1923 |
| 1,458,543 | Pollak | June 12, 1923 |
| 1,638,342 | Kessler | Aug. 9, 1927 |
| 2,041,496 | Shinkle | May 19, 1936 |
| 2,047,220 | Patterson | July 14, 1936 |
| 2,114,985 | Schuler | Apr. 19, 1938 |
| 2,128,962 | Patterson | Sept. 6, 1938 |
| 2,133,886 | Beegle et al. | Oct. 18, 1938 |
| 2,164,329 | Jewett | July 4, 1939 |
| 2,217,265 | Cislak | Oct. 8, 1940 |
| 2,286,964 | Hucks | June 16, 1942 |
| 2,295,969 | Powers | Sept. 15, 1942 |
| 2,381,944 | Wilson et al. | Aug. 14, 1945 |
| 2,398,649 | Kvalnes | Apr. 16, 1946 |